(12) United States Patent
Ginsberg-Klemmt et al.

(10) Patent No.: US 11,515,833 B1
(45) Date of Patent: Nov. 29, 2022

(54) PORTABLE SOLAR CARPORT SYSTEM

(71) Applicants: Antonia Ginsberg-Klemmt, Sarasota, FL (US); Achim Ginsberg-Klemmt, Sarasota, FL (US)

(72) Inventors: Antonia Ginsberg-Klemmt, Sarasota, FL (US); Achim Ginsberg-Klemmt, Sarasota, FL (US)

( * ) Notice: Subject to any disclaimer, the term of this patent is extended or adjusted under 35 U.S.C. 154(b) by 0 days.

(21) Appl. No.: 17/326,687

(22) Filed: May 21, 2021

(51) Int. Cl.
*H01L 31/044* (2014.01)
*H02S 30/10* (2014.01)
*H02S 10/40* (2014.01)
*H02S 20/30* (2014.01)
*E04H 6/02* (2006.01)

(52) U.S. Cl.
CPC ............ *H02S 30/10* (2014.12); *E04H 6/025* (2013.01); *H02S 10/40* (2014.12); *H02S 20/30* (2014.12)

(58) Field of Classification Search
CPC ....... H01L 31/00–078; Y02E 10/50–60; E04H 6/025; H02S 20/00–32; H02S 30/00–20
See application file for complete search history.

(56) References Cited

U.S. PATENT DOCUMENTS

| 2011/0094569 | A1* | 4/2011 | Hartley | H02S 20/10 136/251 |
| 2013/0174889 | A1 | 7/2013 | Dalland et al. | |
| 2013/0229141 | A1* | 9/2013 | Johnson | G06Q 10/06315 29/897.3 |

FOREIGN PATENT DOCUMENTS

| BE | 3798389 | * | 3/2021 |
| CN | 105971331 | * | 9/2016 |
| CN | 105971331 A1 | | 9/2016 |
| CN | 106703465 | * | 4/2019 |
| CN | 106703465 A | | 4/2019 |
| DE | 202012102049 | * | 7/2012 |
| DE | 202012102049 U1 | | 7/2012 |
| EP | 3798389 A1 | | 3/2021 |
| JP | 3205188 | * | 7/2016 |
| JP | 32015188 U | | 7/2016 |
| WO | 2017030516 A1 | | 2/2017 |
| WO | WO2017030516 | * | 2/2017 |

OTHER PUBLICATIONS

CN106703465 English translation (Year: 2019).*
JP3205188 English translation (Year: 2016).*
CN105971331 English translation (Year: 2016).*
DE202012102049 (Year: 2012).*

* cited by examiner

*Primary Examiner* — Bach T Dinh
(74) *Attorney, Agent, or Firm* — Donald R. Boys; Central Coast Patent Agency LLC

(57) ABSTRACT

A solar carport system has a framework comprising metal tubing and connection fittings, the framework having a length, a width and a height and rectangular faces on top, ends and sides, a plurality of wheel assemblies at a lowermost location on the framework, enabling the framework to be moved on the wheels on a supporting surface, a plurality of solar panels assembled to the framework in the top rectangular face, such that an active surface of each solar panel faces upward, and circuitry and wiring connecting the solar panels to a cable ending in a connector compatible with and connected to an inverter.

10 Claims, 12 Drawing Sheets

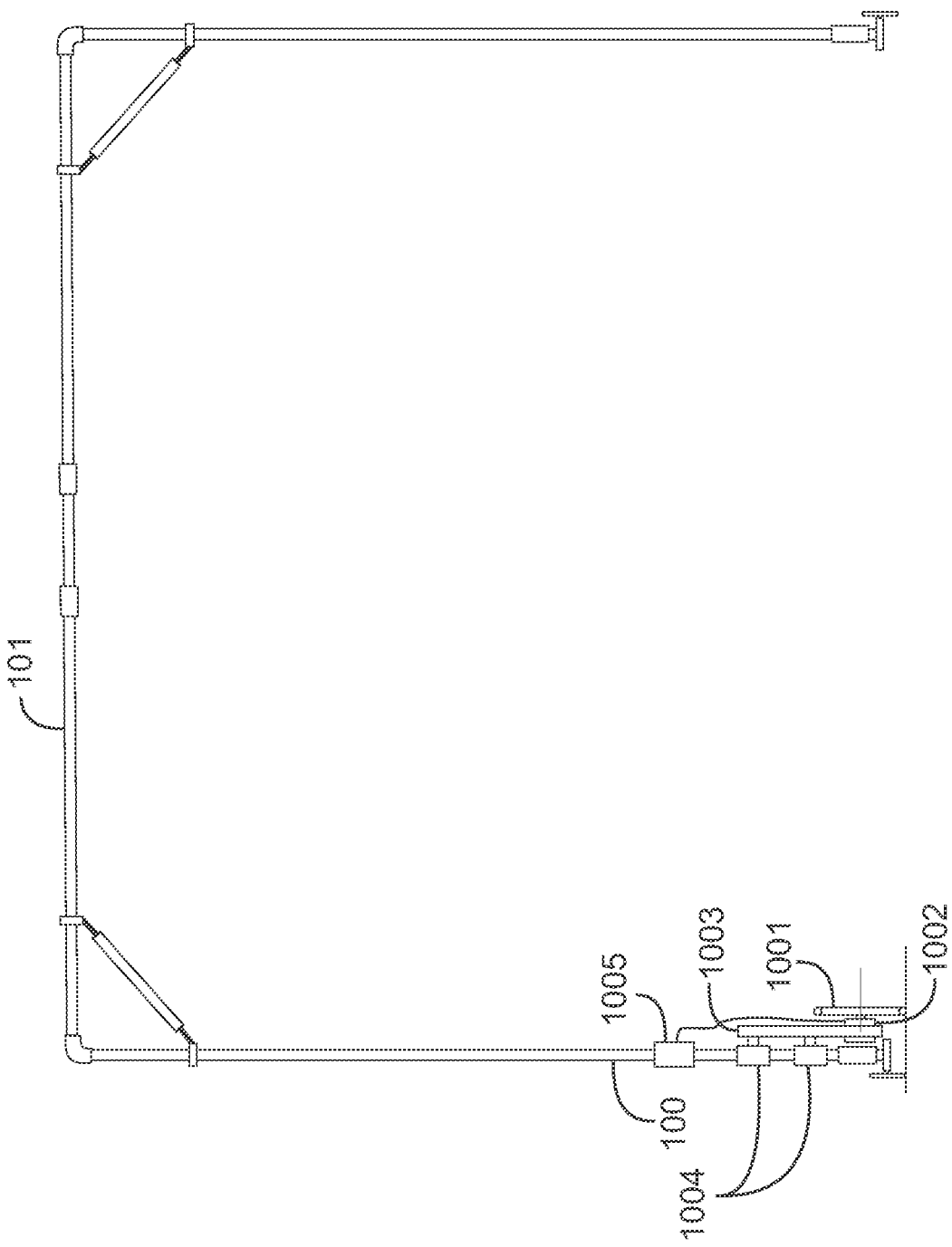

PORTABLE SOLAR CARPORT SYSTEM

BACKGROUND OF THE INVENTION

1. Field of the Invention

The present invention is in the technical area of solar power generation and pertains more particularly to a system configured as a portable carport.

2. Description of Related Art

Solar systems are notoriously well known in the art and comprise generally a plurality of solar panels that convert sunlight to electrical energy, the solar panels mounted to a fixed structure and connected an electrical apparatus termed an inverter that converts the DC voltage produced by the solar panels to a common voltage useful in a public or private electrical AC grid. In the United States a common voltage for conversion may be 240 volts AC, which is the finally stepped down voltage provided to most homes and businesses from the public grid.

A quite common circumstance involves solar panels mounted on fixed carrier apparatus on the roof of a home or business. This is a common pattern when dealing with a single home or business. In other circumstances solar panels may be mounted and connected in what might be termed a solar farm, where a large area of solar panels may be located in a rural area, for example, and the electrical output may be provided directly into a public grid, or to a private grid supplying a number of homes or businesses.

It is most common in the art that mounted solar panels are more or less permanently mounted, and not readily moved, such as known for solar panels in a roof installation. Therefore, such panels and the apparatus to which they mount are subject to radical weather events. Exposed panels may be severely damaged, for example, by hurricanes, hailstorms, wind driven debris, tornadoes, falling trees and branches in windstorms, and by a variety of other damaging circumstances.

Given the above discussion the inventors believe that what is clearly needed are movable or portable structures to which solar panels are mounted in a way that the structures, hence the expensive panels as well, may be quickly and efficiently brought into a protective structure, like, for example a garage.

BRIEF SUMMARY OF THE INVENTION

In one embodiment of the invention a solar carport system is provided, comprising a framework having metal tubing and connection fittings, the framework having a length, a width and a height and rectangular faces on top, ends and sides, a plurality of wheel assemblies at a lowermost location on the framework, enabling the framework to be moved on the wheels on a supporting surface, a plurality of solar panels assembled to the framework in the top rectangular face, such that an active surface of each solar panel faces upward, and circuitry and wiring connecting the solar panels to a cable ending in a connector compatible with and connected to an inverter.

In one embodiment the end rectangular faces have a width of eight feet and a minimum height of six feet, and no cross members, such that an automobile may be driven through the length of the framework under the top face or may be parked under the framework. Also, in one embodiment the solar panels are bifacial panels in which both sides of the panels are active. In one embodiment the wheel assemblies present universal casters that may be extended to lift and roll the framework or retracted to set the framework on the supporting surface. And in one embodiment the framework comprises two free standing end structures, each carrying solar panels, the end structures connected by lengthwise tubes at the uppermost level, held to each end structure by clamp mechanisms, such that the lengthwise connecting tube may be removed, and the free-standing end structures may be rolled separately from one another, including being rotated in a horizontal plane.

In one embodiment the system further comprises additional solar panels mounted rotationally to tubes along outside upper edges of the framework, such that the additional solar panels may be deployed to a horizontal orientation and retracted to a near vertical orientation. Also, in one embodiment the system further comprises additional solar panels mounted in connecting structure between the end structures at the upper level of the framework. Also, in one embodiment the system further comprises a storage structure, having a door through which the storage structure is entered and exited, wherein the end structures are stored in the storage structure, deployed through the door onto an outside supporting surface, connected by the lengthwise tubes in clamp fittings, and set down on the supporting surface by manipulating the wheel assemblies, wherein the deployed carport system generates electricity fed to the inverter through the connecting cable. In one embodiment the end structures are separated, the wheel assemblies are extended, and the end structures are rolled from the outside supporting surface into the storage structure. And in one embodiment the storage structure is a garage having a garage door, and the outside support surface is a driveway ending at the garage door.

In one embodiment of the system the inverter is a combination inverter/charger having cables and connectors for charging electric vehicles. Also, in one embodiment the inverter is connected electrically to house or business wiring, and with the framework deployed and the solar panels exposed to sunlight the system provides electric power to the home or business, to a connected public or private grid, and to electrical vehicle batteries. And in one embodiment individual ones of the solar panels are connected to a micro-inverter converting direct current to alternating current.

BRIEF DESCRIPTION OF THE SEVERAL VIEWS OF THE DRAWINGS

FIG. 10 is an end view of the framework in an embodiment employing a drive motor and wheel.

DETAILED DESCRIPTION OF THE INVENTION

Figure 1:
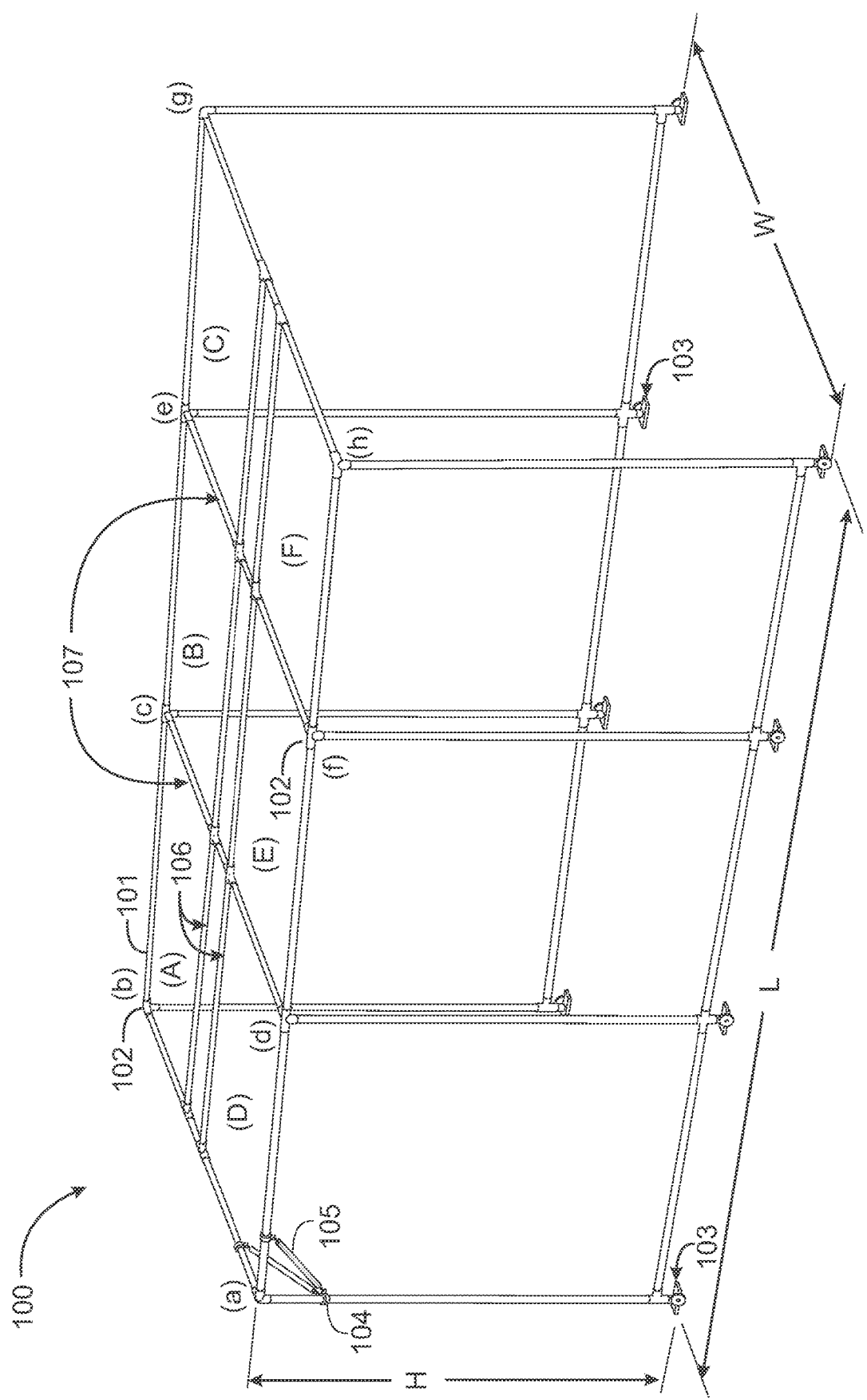
FIG. 1 is a perspective view of a movable framework in an embodiment of the present invention.

FIG. 1 is a perspective view of a movable framework 100 in an embodiment of the present invention. Framework 100 in this example is constructed of aluminum tubing sections such as section 101 which are joined by cast aluminum fittings such as fitting 102, which is a corner fitting. Many such fittings are commercially available. In the present example the tubing is standard 2.0 inch OD aluminum tubing, and once joined with a fitting tubing sections are TIG welded to the fittings.

Each upright (vertical) element in framework 100 ends at the lowermost extremity with a wheel assembly such as assembly 103. In this example there are eight such wheel assemblies. In some embodiments there may be more or fewer than eight, and the wheel assemblies may have a locking brake. In alternative embodiments the wheels may be extendable and retractable, such that the framework may be caused to rest directly on a supporting surface with the wheels raised.

One corner (a) of the framework is shown to be reinforced by braces 105 between clamps 104 fastened to the aluminum tubing. Although not explicitly shown in the figure, corners (b) through (g) may be similarly braced, and typically will be so braced. This triangulation adds needed strength and rigidity to the framework.

In FIG. 1 it is seen that the framework has a horizontal upper level defined by corners (a), (b), (h) and (g). This upper level is divided in this example by two lengthwise tubing arrangements 106 and by two lateral tubing arrangements 107, into six rectangular regions labeled in this example (A), (B), (C), (D), (E) and (F). These regions are sized by the placement of these tubing arrangements to be of the size of solar panels to be used with the system, as is described in enabling detail below.

Framework 100 has a height H, a width W, and a length L in this example, and these dimensions are important to the purpose of the invention. In one embodiment the framework supports solar panels in a solar panel system that doubles as a carport and utilizes driveway space to expose solar panels to sunlight to generate electrical energy, which may be used both for supplementing electrical power in a household associated with the driveway space, and to charge batteries for electrical vehicles that may be under the framework or in a nearby garage. Width W for purposes of the invention needs to be wider than an automobile associated with the system in a use case, but more narrow than a width of a garage doorway associated with the system, length L needs to as long as or longer than the automobile, and height H needs to be higher than the overall height of the automobile but less than the height of the garage door. It will be apparent that these dimensions may vary depending on use case and application, but one set of dimensions may well work for most applications.

Figure 2:
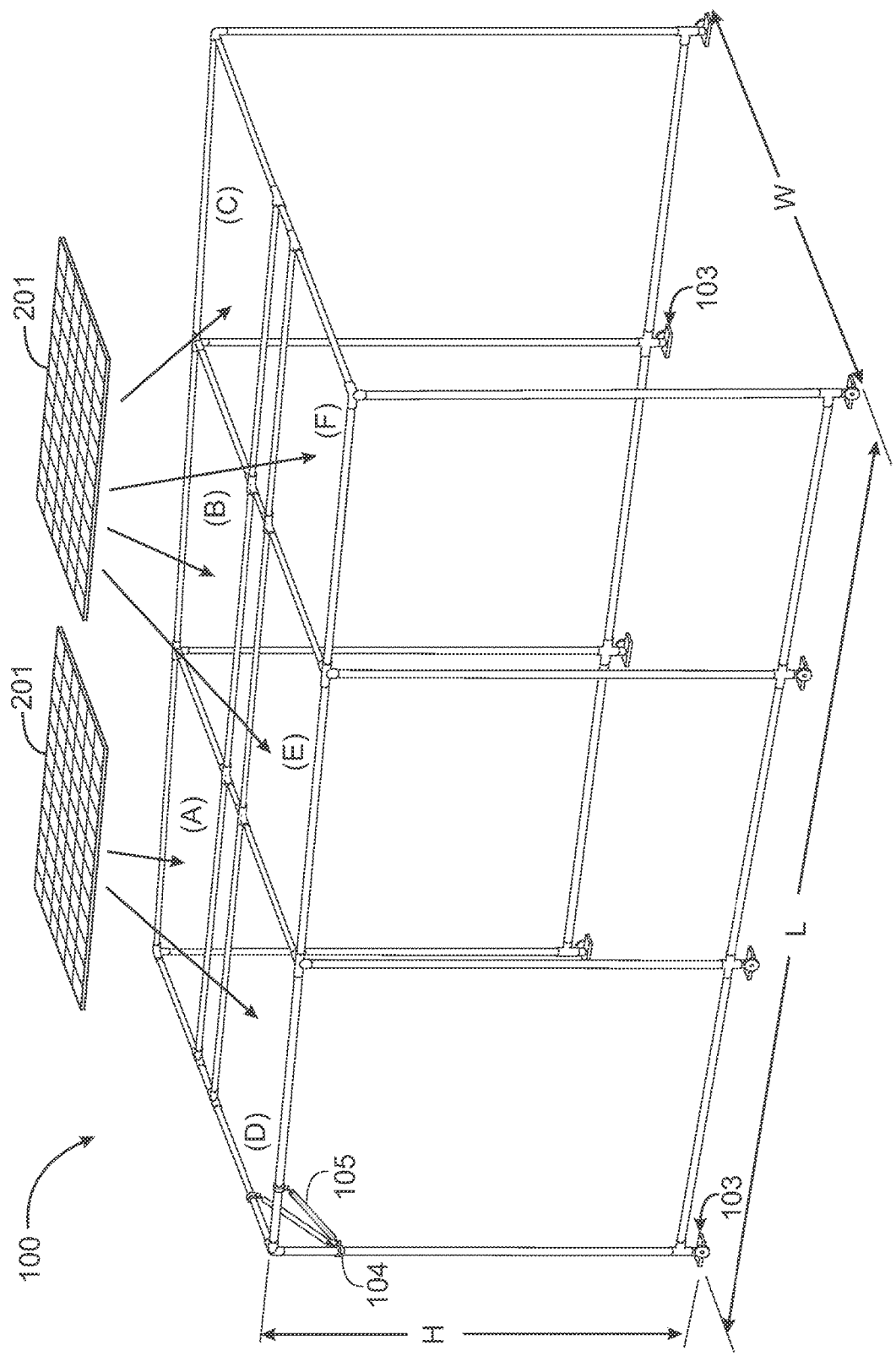
FIG. 2 is a perspective view of the framework of FIG. 1 showing where solar panels are mounted in an embodiment of the invention.

FIG. 2 is a perspective view of framework 100 of FIG. 1 with solar panels 201 shown to be added to regions (A) through (F). In this example the solar panels are GCL-M6/72DH Bifacial panels. Bifacial means that the 12 solar cells that make up one solar panel 201 are made to be active on both sides. When installed in regions (A) through (F) of the framework these six panels will be active especially for sunlight from above but will also be active and will generate electricity by reflected sunlight from surfaces of a vehicle under the framework.

Figure 3:
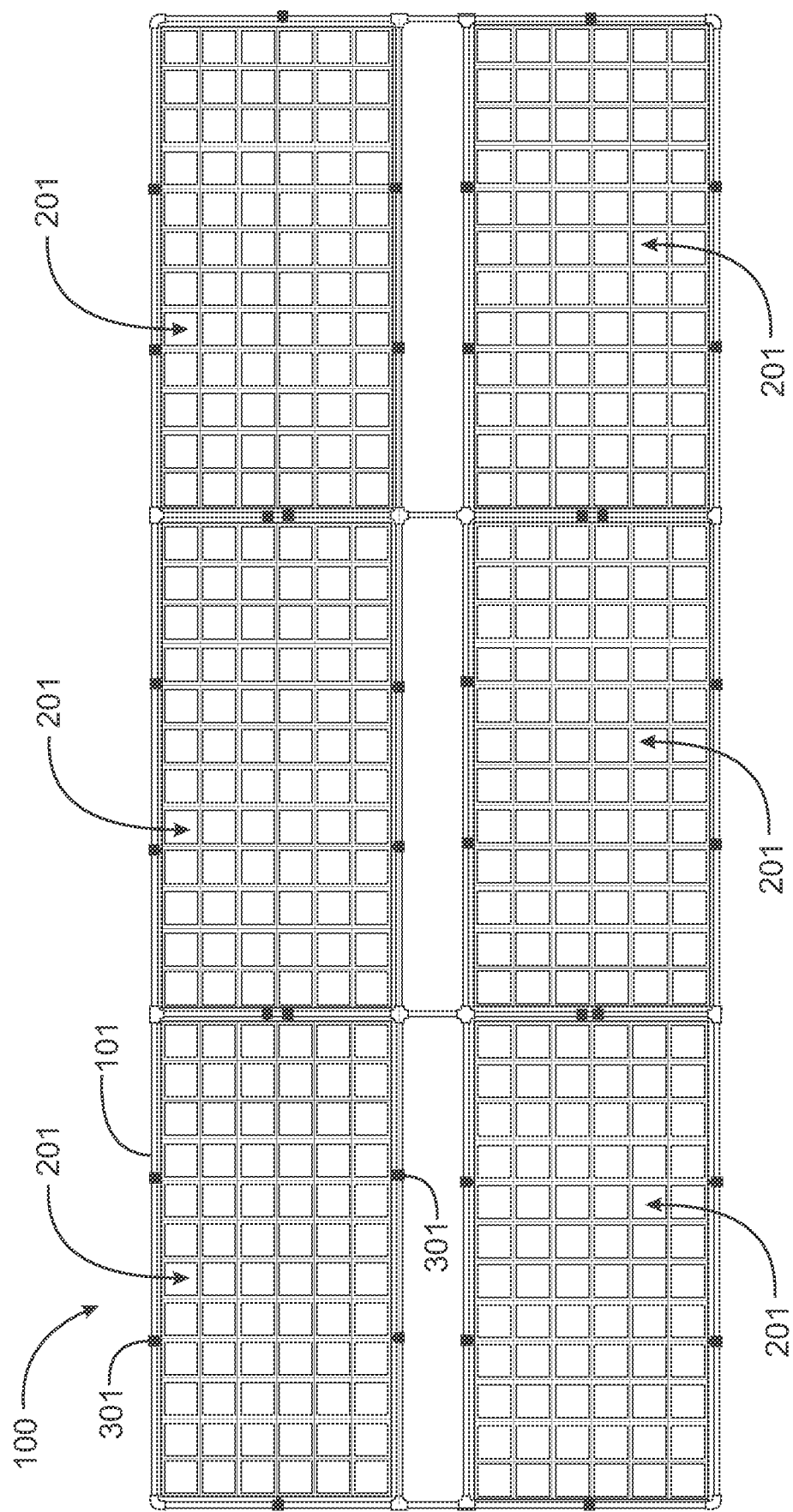
FIG. 3 is a plan view of an upper level of the framework showing six solar panels mounted in an embodiment of the invention.

FIG. 3 is a plan view of the upper level of framework 100 with solar panels 201 installed in each of the six regions (A) through (F) in this example. In this example the solar panels are GCL-M6/72DH Bifacial panels as indicated above, with each panel about 80 inches in length, so the overall length of the structure is a little more than three times this dimension, or about 20 feet in length. The width is about 8 feet. The solar panels are retained within each of regions (A) through (F) by use, in this example, of connectors 301, which in this example are clamps that are attached over the 2 inch tubes of the tubular frame, and connect to holes on the sides of the solar panels. This, it will be understood, is just one of a variety of ways that the solar panels may be secured in the regions of the framework. In the example of FIG. 3 there are 6 solar panels exposed to sunlight, but the structure in embodiments of the invention is not limited to 6 panels.

Figure 4:
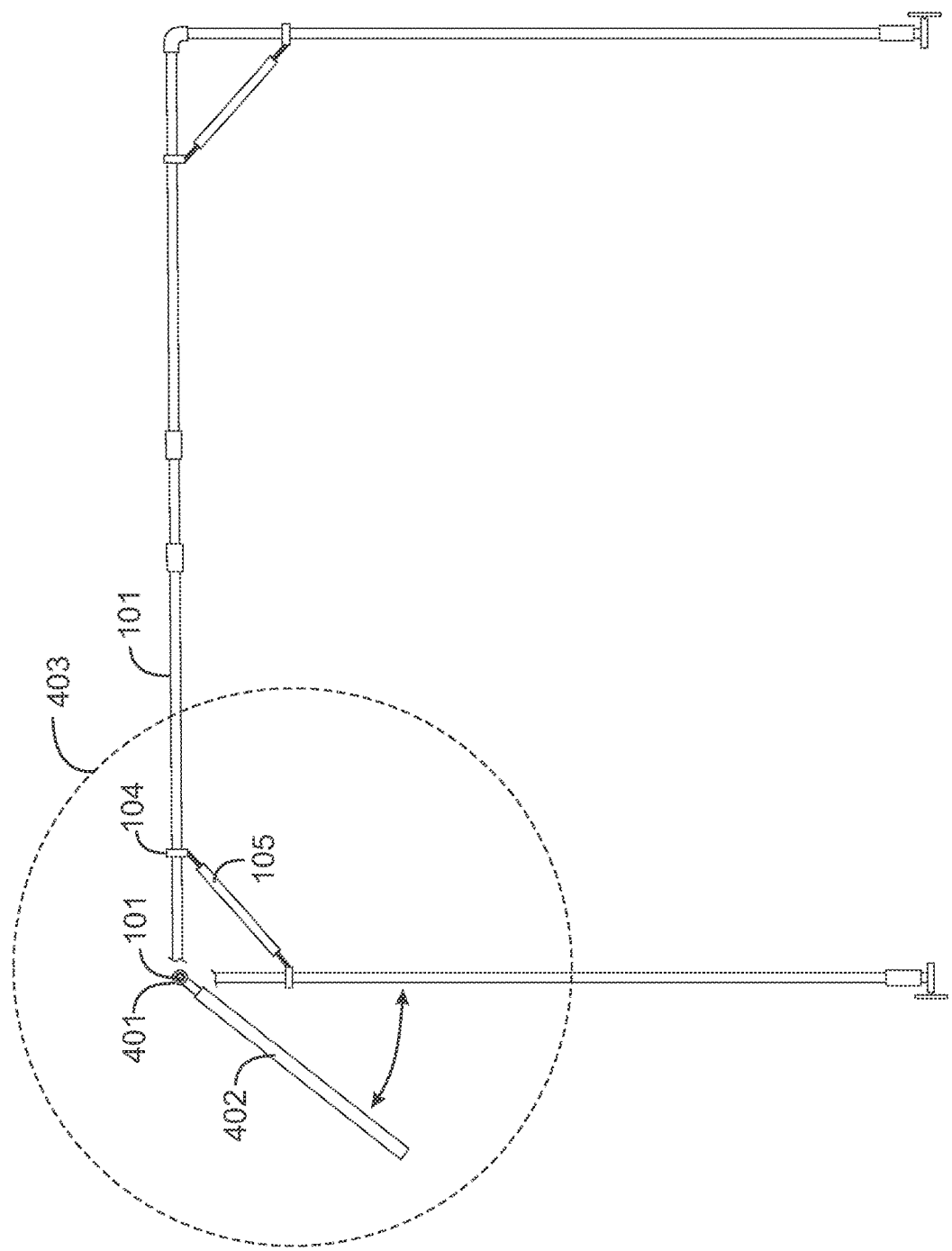
FIG. 4 is an end view of the framework showing how additional solar panels may be added to the framework.

FIG. 4 is an end view of framework 101 showing mounting of additional panels to outside tubes of the framework in a manner that the additional panels may be rotated into a horizontal position for maximum effect and may be rotated to a nearly vertical position to enable the framework to minimize the overall width to enable the structure to be moved, for example, from a driveway to inside a garage. In FIG. 4 a corner cast aluminum fitting is removed in the figure to show a clamp mechanism 401 mounted to a lengthwise upper tubing, with the clamp mechanism attached to a panel frame 402 which may hold a solar panel. The frame 402 is shown at an angle of about 30 degrees from vertical but may be lowered to minimize the overall width of the structure or raised so that a mounted solar panel in frame 402 may be horizontal for maximum sunlight exposure.

Figure 5:
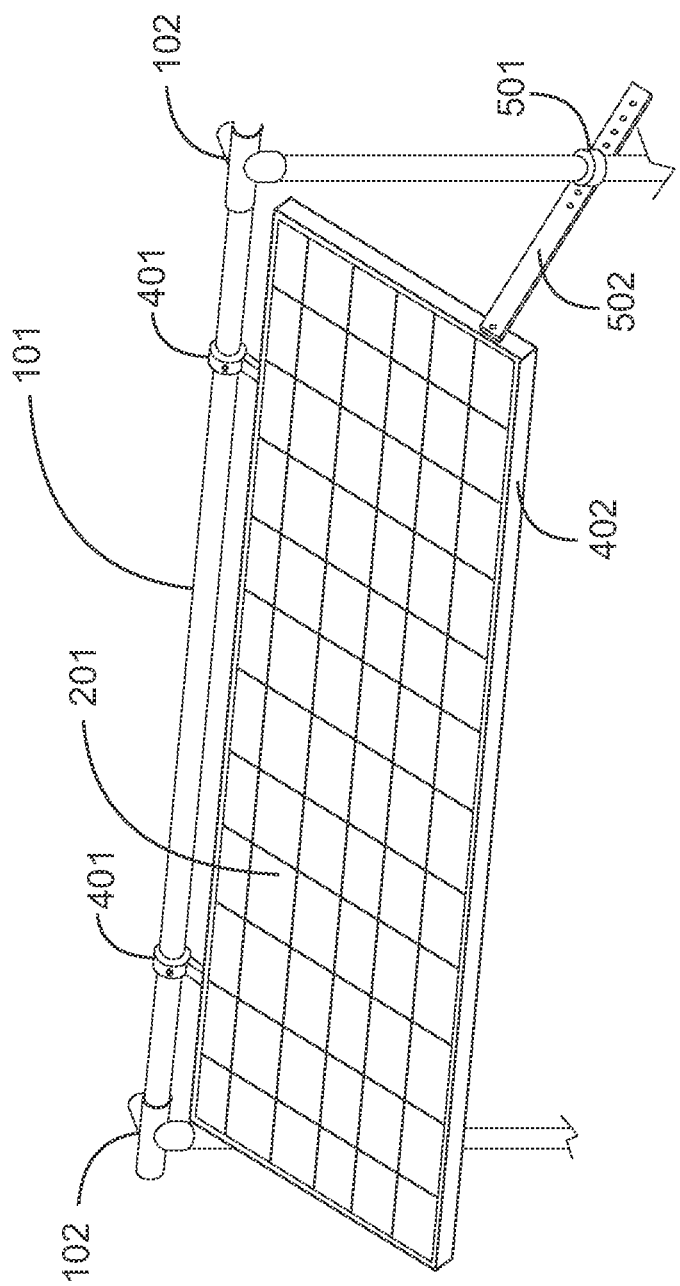
FIG. 5 is a perspective view of a frame mounted to the side tubing to better illustrate the nature of the mounting in this embodiment.

FIG. 5 is a perspective view of frame 402 mounted to the side tubing 101 to better illustrate the nature of the mounting in this embodiment. Frame 402 mounts a solar panel 201 the same as the solar panels mounted in the upper level as shown in FIG. 3. Clamp mechanisms 401 may be loosened to rotate frame 402 and tightened to secure the frame, and therefore the solar panel, at a new attitude, including a horizontal attitude parallel with the solar panels mounted in the upper level. In an alternative embodiment there may be props 502 connecting to anchors 501 by which the side panels may be raised or lowered. It will be apparent that there are a variety of ways that side frames 402 carrying solar panels may be raised or lowered.

As many as six frames 402 with solar panels 201 may be provided along the sides of the framework, three along each side, which effectively doubles the number of solar panels in the apparatus, to twelve.

Figure 6:
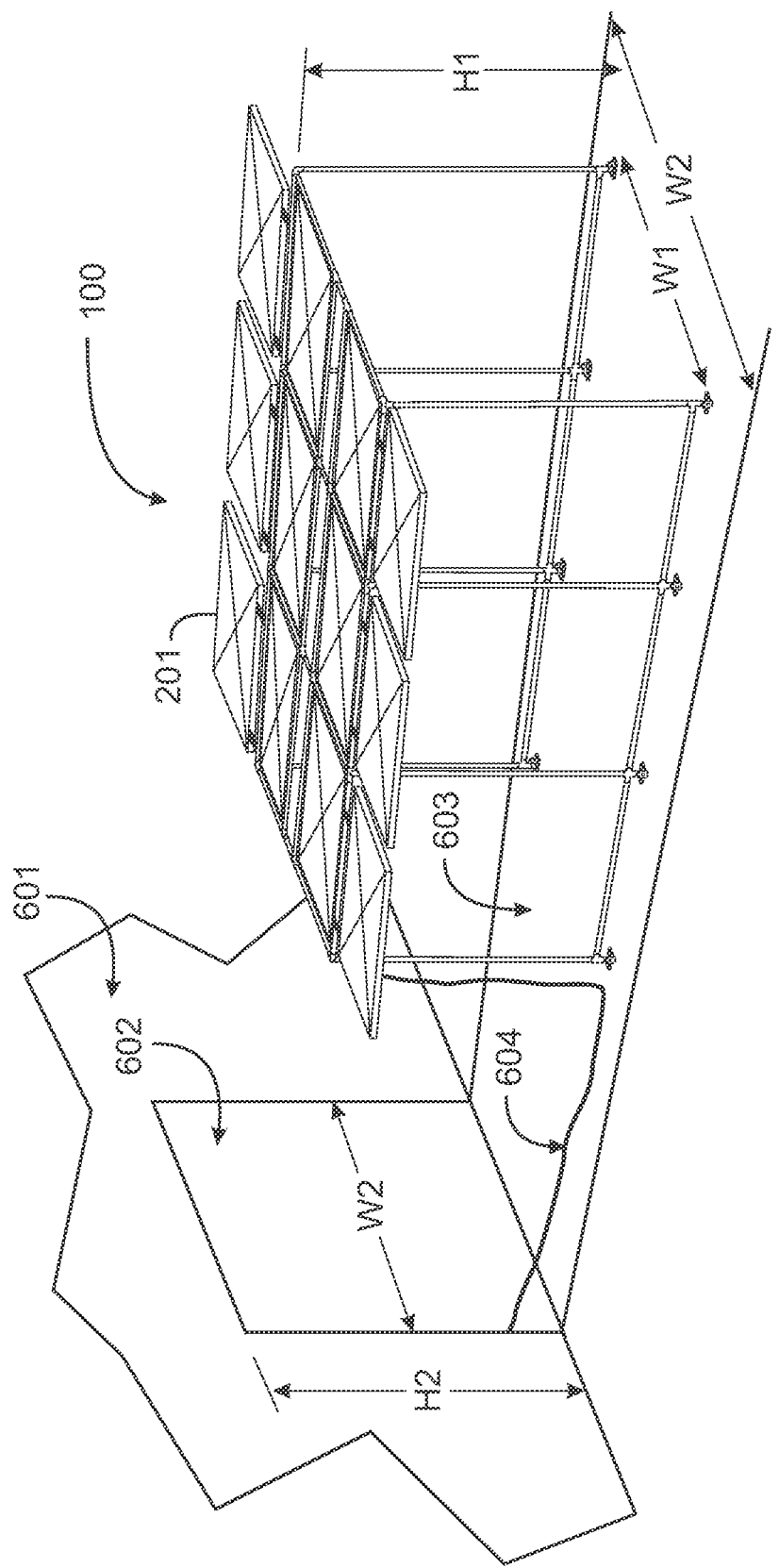
FIG. 6 illustrates the movable framework with mounted solar panels positioned in a driveway leading to a garage door.

FIG. 6 illustrates movable framework 100 with a full complement of mounted solar panels 201 positioned in a driveway 603 leading to a garage door 602 in a side of a home or business 601. It may be seen that the extra side panels to each side of the framework are deployed level with the solar panels in the top of the framework such that all twelve solar panels are parallel and horizontal. Width of the driveway is W2 which is greater than the width W1 of framework 100. The width of the garage door opening is also W2, the same as the width of the driveway in this example. The height of the framework H1 is less than the height w2 of the garage door. The deployment of the side panels provides maximum energy generation, which is routed to an inverter in the garage by a cable 604, but this makes the overall width greater than the width W2 of the garage door. In this configuration the moveable framework can not be rolled into the garage.

Figure 7:
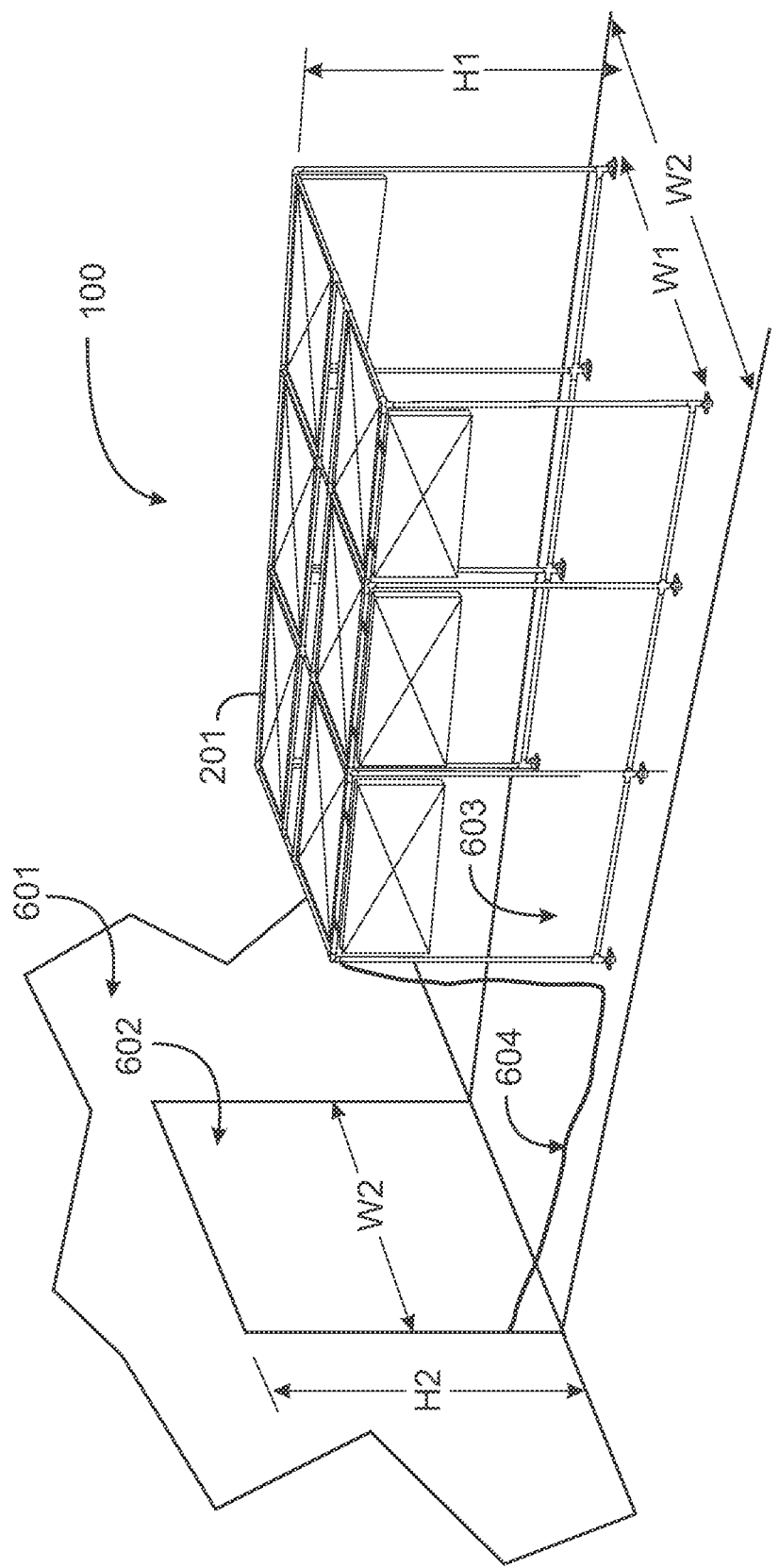
FIG. 7 is a perspective view of the framework in the driveway with outside panels lowered.
Figure 8:
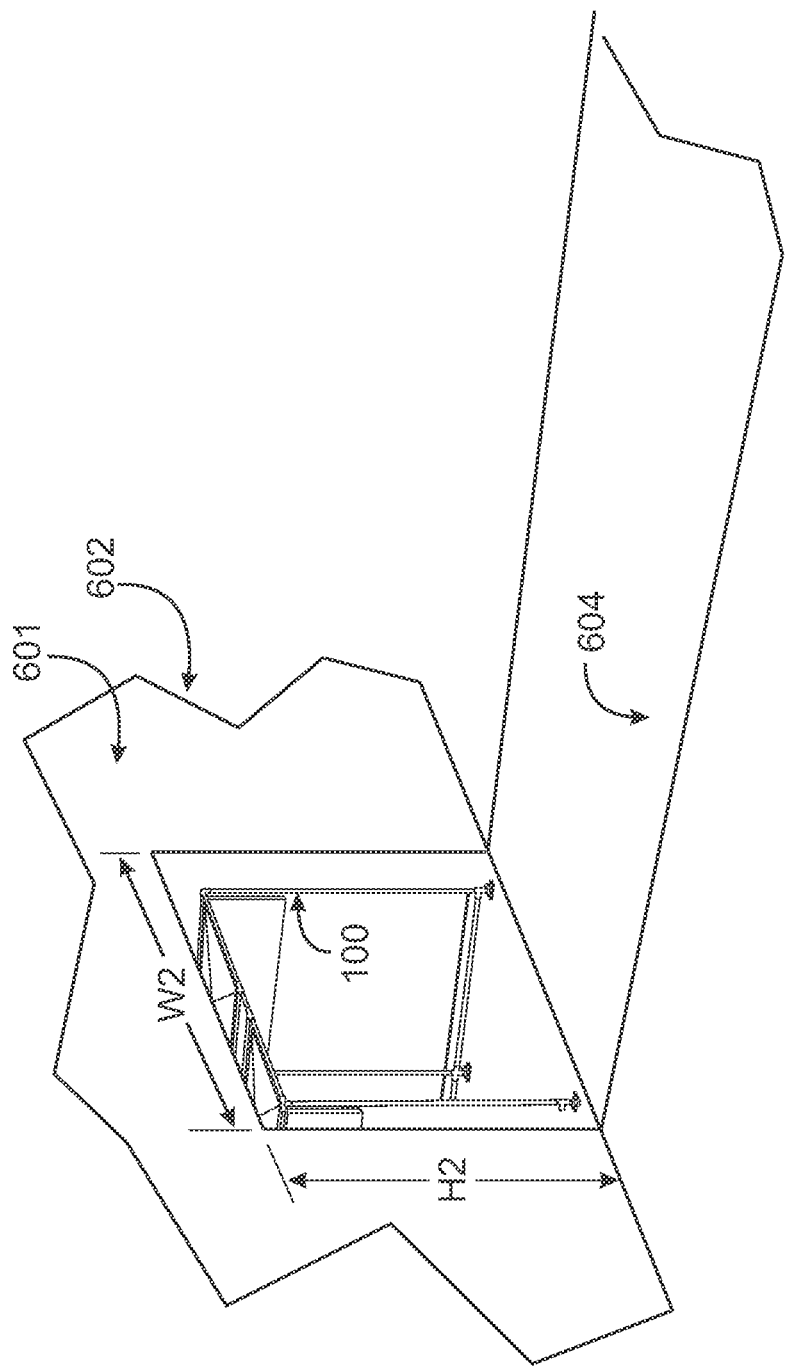
FIG. 8 is a perspective view of the driveway with the framework rolled into the garage.

FIG. 7 illustrates the circumstance of FIG. 6 except the side panels have been retracted to a vertical position, reducing the overall width of the framework with panels to W1. In this configuration the framework with panels may be rolled into the garage through the garage door. FIG. 8 illustrates the framework 100 with solar panels moved into the garage through the garage door.

In the examples shown and described, with a framework with solar panels stored in the garage, an automobile, a truck or motorcycles may still be parked in the garage beneath the framework, as the inside height and width of the framework is high and wide enough to clear most automobiles. A user may open the garage door and manually roll the framework on wheel assemblies 103 out of the garage through the garage door, trailing cable 604 until the framework is fully deployed in the driveway. The side panels may then be deployed level, and the system will generate electricity. At a time when a weather event, or for some other reason it is determined to store the framework in the garage the side panels may be lowered, the garage door opened, and the framework may be rolled back into the garage with enough space to also park the car underneath.

Cable 604 in one embodiment ends in a standard 240 volt connector, which may be plugged into an inverter to connect into the house or business wiring, and the solar panel system will supplement electrical usage in the home or business as an electricity generating appliance. In one embodiment the inverter is a Solar Edge™ HD Wave inverter which accepts a 240V connector and also provides connectors for charging electric vehicles. The entire system functions as an electricity generating, portable appliance in one unit. This unit in one embodiment is mounted just inside the garage door but may be positioned elsewhere as well.

Figure 9:
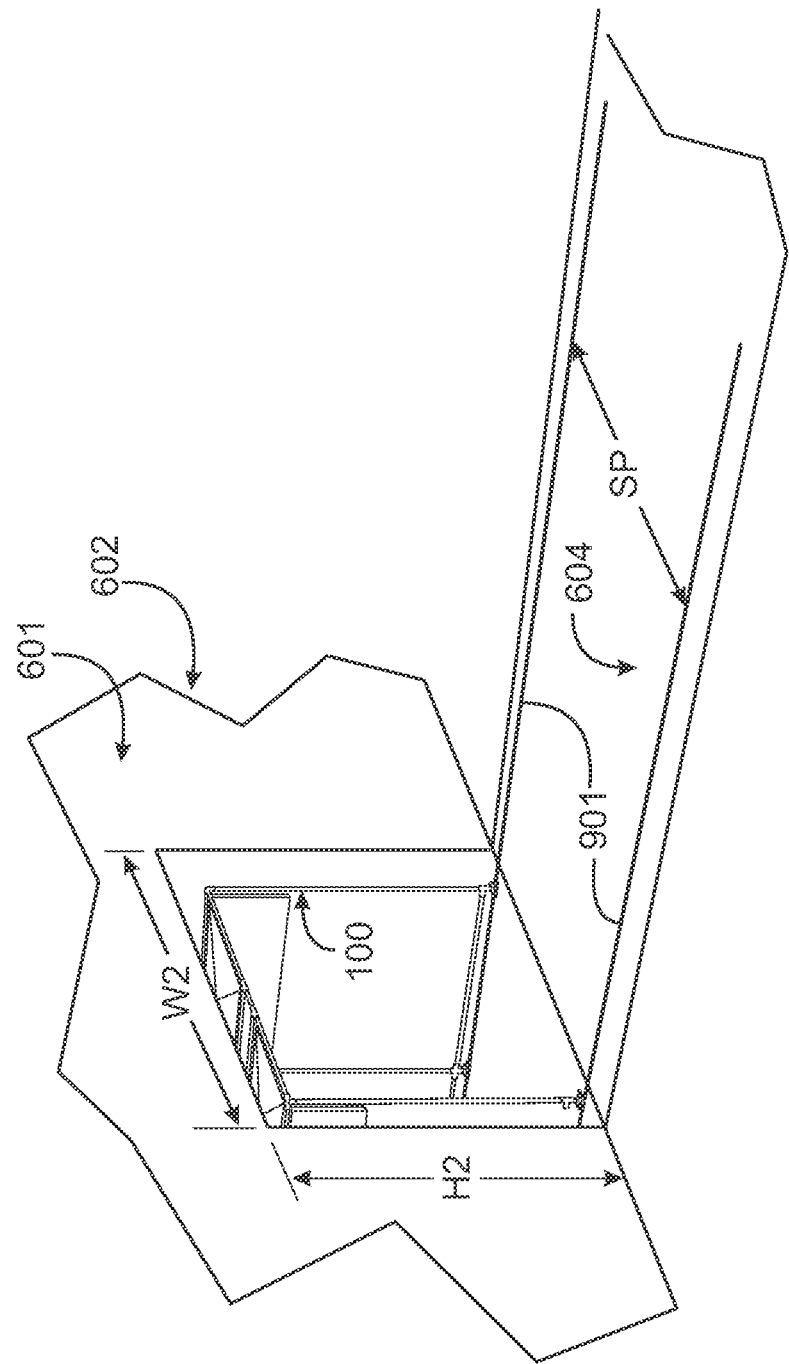
FIG. 9 is a perspective view of a driveway with tracks to guide the framework as the framework is moved.

FIG. 9 illustrates an embodiment of the system of the invention wherein optional tracks 901 are provided on the driveway at a spacing SP to match the distance between wheels 103 on the movable framework. The optional tracks may be either cut into the driveway or strips of material may be laid onto and adhered to the surface of the driveway to form the tracks. The optional tracks guide the framework both going into and coming from the garage.

FIG. 10 illustrates an alternative embodiment wherein a single wheel 1001 driven by a DC motor 1002 mounted in a frame 1003 fastened to an upright of the framework by clamps 1004 is provided on one side at a lower level of the framework at the end of the framework that first enters and last leaves the garage. The motor may be driven in either direction and turned on and off to propel the framework from the garage and to bring it back into the garage. On-off and direction inputs may be provided on a small junction box 1005 fastened to an upright of the framework near the motor and wheel. In an alternative embodiment there may be circuitry in junction box 1003 with Bluetooth or other wireless communication capability, and an application may be provided on a smart phone with an interactive interface to operate the drive wheel to propel the framework into or out of the garage. This apparatus works best in an embodiment wherein tracks, as in FIG. 9, are provided to constrain the wheels 103 of the framework.

In one embodiment cable 604 that connects the solar panels of the apparatus of the invention to an inverter may be wound on a reel in the garage with spring constraint, such that the cable plays out as the framework is moved from the garage to a position in the driveway, and winds back on the reel as the framework re-enters the garage.

Figure 11A:
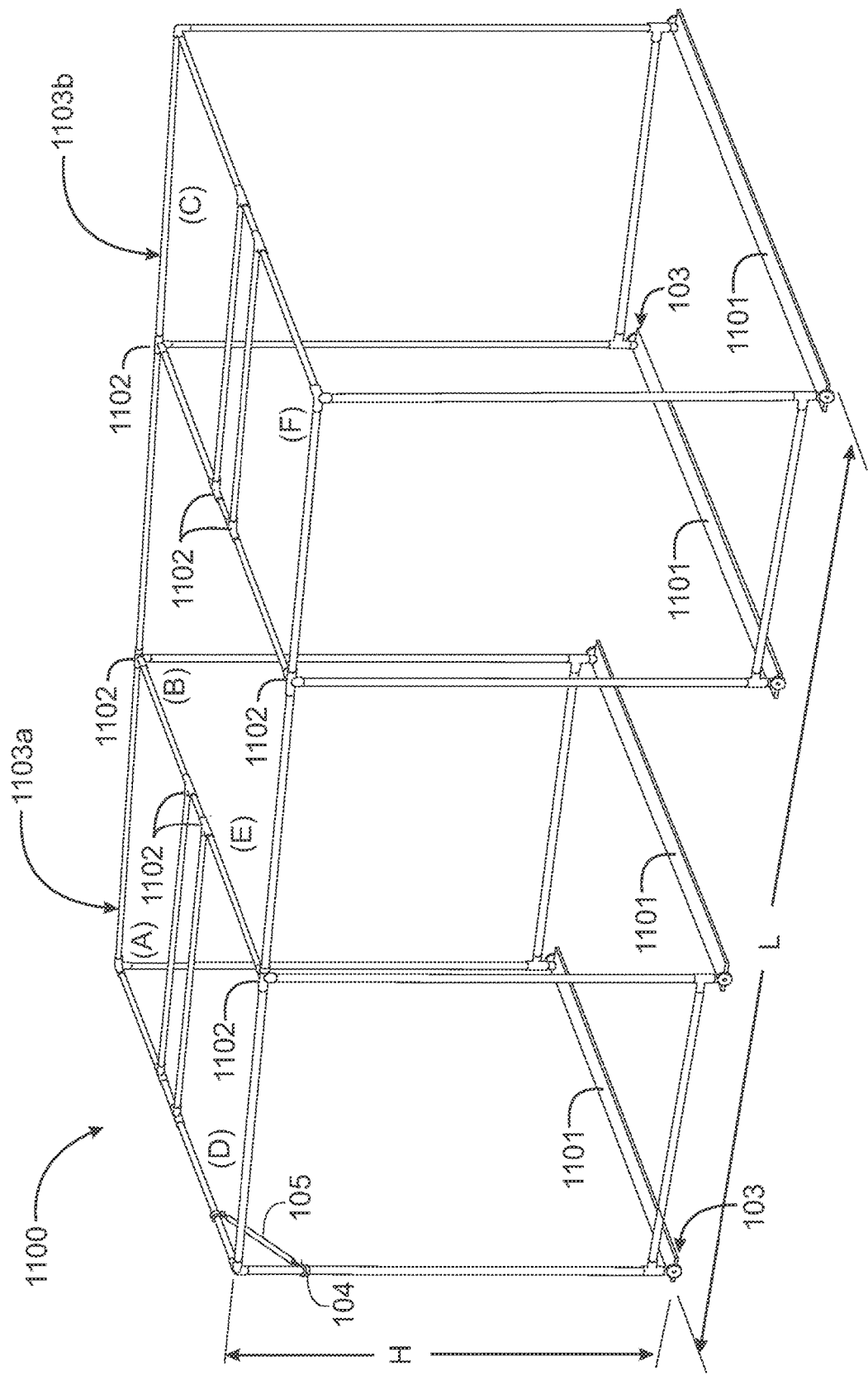
FIG. 11A is a perspective view of a solar carport structure in another embodiment of the invention.

FIG. 11A is a perspective view of a structure for a portable solar carport in another embodiment of the invention. In this embodiment two rectangular structures 1103a and 1103b that are mirror images are joined by tubes only at the upper level, the tubes engaged in fittings 1102 that are fittings that enable the tubes to be engaged and disengaged. The structures are joined side-to-side additionally by flat bars 1101.

In this embodiment wheel assemblies 103 are of a commercially available sort well-known in the art that may be deployed and retracted such that the structure may be slightly raised on caster wheels that allow universal horizontal movement and lowered to cause the structures to rest on the flat bars 1101.

With the structures 1103a and 1103b joined as shown in FIG. 11A solar panels may be mounted exactly as described above with reference to FIG. 2 and also referenced in other descriptions, and the joined structure may reside on a driveway providing electricity generation just as described herein in other embodiments.

Figure 11B:
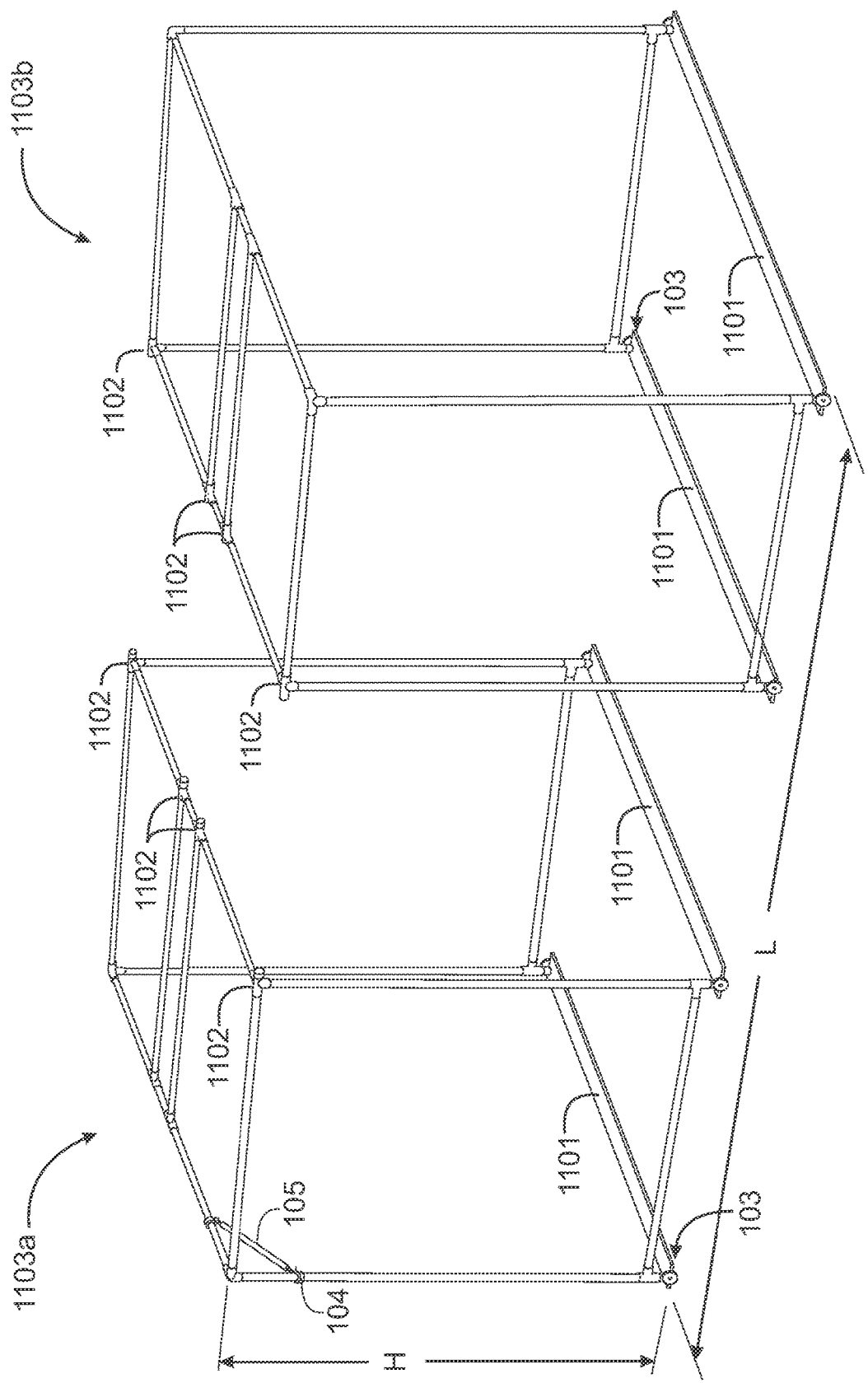
FIG. 11B is a perspective view of the structure of FIG. 11A with tubings removed to produce two separate portable units.

When a user has determined to store the portable solar carport in a garage or other storage area the user may disconnect the tubes joining structures 1103a and 1103b by releasing the tubes joined by fittings 1102 and removing the tubes. FIG. 11B illustrates the result, with structures 1103a and 1103b now separate structures, separately movable. The user may now deploy the caster wheel mentioned above to raise the structures separately on the caster wheels, and each structure may be separately rotated and moved into the garage separately. This innovation provides a means of moving and deploying the overall structure of the portable solar carport that is easier for the user to manually manipulate.

In one embodiment of the invention individual ones of the solar panels may be connected directly to a micro-inverter, converting the direct current (DC) produced to an alternating current (AC).

Having illustrated and described a number of examples of the invention it is again emphasized here that the framework is open both in the front and the rear with sufficient height and width that a user may park an automobile or other vehicle under the framework with the framework positioned in the driveway to present solar panels to sunlight. Moreover, the user may drive a vehicle under and through the framework and into the garage. The system of the invention presents no real impediment to the use of the garage or the driveway.

A person skilled in the art will understand that the embodiments described above are each and all exemplary, and not limited to the scope of the invention, which is limited only by the claims. There are a variety of ways that different features of the invention may be implemented other than the specific ways disclosed in the examples illustrated and described. For example, there are many materials that may be used for the framework other than aluminum tubing. Many sorts of solar panels may be employed. There are a variety of ways the framework may be carried and propelled in use. The scope is limited only by the claims.

The invention claimed is:

1. A solar carport system, comprising:
a storage building having an inner floor and an opening into the storage building;

a driveway beginning at a level of the inner floor, proceeding from the opening away from the storage building;

a first framework of cuboid shape comprising metal tubing and connection fittings, the first framework having upright elements at corners, cross members and lengthwise connecting members, a length, an overall width, an overall height and rectangular faces on top, ends and sides, a plurality of solar panels assembled to the first framework in the top rectangular face, such that an active surface of each solar panel faces upward, circuitry and wiring connecting the solar panels to a first cable comprising a first electrical connector, and a plurality of wheel assemblies at a lowermost location enabling the first framework to be moved on the wheel assemblies;

a second framework of cuboid shape comprising metal tubing and connection fittings, the second framework having upright elements at corners, cross members and lengthwise connecting members, the length of the first framework, the overall width of the first framework and the overall height of the first framework, and rectangular faces on top, ends and sides, a plurality of solar panels assembled to the second framework in the top rectangular face, such that an active surface of each solar panel faces upward, circuitry and wiring connecting the solar panels to a second cable comprising a second electrical connector and a plurality of wheel assemblies at a lowermost location enabling the second framework to be moved on the wheel assemblies; and characterized in that the end rectangular faces of both the first and second frameworks have an inside width and an inside height sufficient to pass an automobile beneath the frameworks between the upright elements, and in that the opening into the storage building is of sufficient dimensions to pass either of the first and second frameworks through the opening.

2. The solar carport system of claim 1 wherein the solar panels are bifacial panels in which both sides of the panels are active.

3. The solar carport system of claim 1 wherein the wheel assemblies present universal casters that are extendable to lift and roll the frameworks or retracted to set the frameworks on the supporting surface.

4. The solar carport system of claim 1 further comprising additional solar panels mounted rotationally along outside upper edges of the frameworks, such that the additional solar panels may be deployed to a horizontal orientation and retracted to a near vertical orientation.

5. The solar carport system of claim 1 wherein the storage building is a garage having a rectangular opening into the garage.

6. The solar carport system of claim 1 comprising an inverter with a connecting interface compatible with the electrical connectors of the cables associated with the frameworks.

7. The solar carport system of claim 1 wherein the inverter is a combination inverter/charger having cables and connectors for charging electric vehicles.

8. The solar carport system of claim 1 wherein individual ones of the solar panels are connected to a micro-inverter converting direct current to alternating current.

9. The solar carport system of claim 5 wherein the rectangular opening into the garage has a width greater than the overall width of the first framework and a height greater than the overall height of the first framework.

10. The solar carport system of claim 6 wherein the inverter is connected to a public or private electrical grid, and with the frameworks deployed on the driveway, the solar panels exposed to sunlight, and the cables connected to the inverter, the system provides electric power to the public or private grid.

* * * * *